US011005643B2

(12) United States Patent
Kang et al.

(10) Patent No.: US 11,005,643 B2
(45) Date of Patent: May 11, 2021

(54) COMMUNICATION RECEIVING DEVICE AND CLOCK DATA RECOVERY METHOD

(71) Applicants: GLOBAL UNICHIP CORPORATION, Hsinchu (TW); TAIWAN SEMICONDUCTOR MANUFACTURING CO., LTD., Hsinchu (TW)

(72) Inventors: Wen-Juh Kang, Hsinchu (TW); Yu-Chu Chen, Hsinchu (TW); Hsun-Wei Kao, Hsinchu (TW)

(73) Assignees: GLOBAL UNICHIP CORPORATION, Hsinchu (TW); TAIWAN SEMICONDUCTOR MANUFACTURING CO., LTD., Hsinchu (TW)

(*) Notice: Subject to any disclaimer, the term of this patent is extended or adjusted under 35 U.S.C. 154(b) by 0 days.

(21) Appl. No.: 16/714,803

(22) Filed: Dec. 16, 2019

(65) Prior Publication Data

US 2021/0083838 A1    Mar. 18, 2021

(30) Foreign Application Priority Data

Sep. 12, 2019 (TW) ................................ 108133086

(51) Int. Cl.
*H04L 7/033* (2006.01)
*H04L 7/00* (2006.01)
(52) U.S. Cl.
CPC ............ *H04L 7/033* (2013.01); *H04L 7/0087* (2013.01)

(58) Field of Classification Search
CPC .............................. H04L 7/0087; H04L 7/033
See application file for complete search history.

(56) References Cited

U.S. PATENT DOCUMENTS

| 4,677,647 A * | 6/1987 | Aoyagi ................. H04L 7/0054 375/232 |
| 8,761,237 B2 * | 6/2014 | Aziz ....................... H03F 3/211 375/229 |
| 9,917,707 B2 * | 3/2018 | Pan .................... H04L 25/03057 |
| 9,929,803 B1 * | 3/2018 | Wu .................... H04B 10/07955 |
| 2015/0016497 A1 * | 1/2015 | Aziz ...................... H04L 7/0029 375/233 |
| 2015/0078499 A1 * | 3/2015 | Miao ...................... H03L 7/087 375/354 |

\* cited by examiner

*Primary Examiner* — David B Lugo
(74) *Attorney, Agent, or Firm* — CKC & Partners Co., LLC (57) ABSTRACT

A communication receiving device includes a clock data recovery circuit, an analog-to-digital converter (ADC), a channel evaluating circuit, a first equalizer, and a selector. The clock data recovery circuit is configured to generate a clock signal according to a first digital signal. The ADC is coupled to the clock data recovery circuit, and configured to convert a first analog signal to a second digital signal according to the clock signal. The channel evaluating circuit is configured to analyze the second digital signal to output a selection signal. The first equalizer is coupled to the ADC, and configured to equalize the second digital signal to generate a third digital signal. The selector is coupled between the first equalizer, the ADC, and the clock data recovery circuit. The selector is configured to output the second digital signal or the third digital signal as the first digital signal according to the selection signal.

16 Claims, 6 Drawing Sheets

COMMUNICATION RECEIVING DEVICE AND CLOCK DATA RECOVERY METHOD

PRIORITY CLAIM AND CROSS-REFERENCE

The present application claims priority to Taiwan Application Serial Number 108133086, filed Sep. 12, 2019, which is herein incorporated by reference.

BACKGROUND

As the data transmission becomes faster and faster, the inter-symbol interference (ISI) in the signal becomes worse. Therefore, the clock data recovery becomes more important. However, the operations of the clock data recovery become harder because of the ISI in the signal, and the efficiency of the clock data recovery gets worse.

SUMMARY

An embodiment of the present disclosure is associated with a communication receiving device which includes a clock data recovery circuit, an analog-to-digital converter, a channel evaluating circuit, a first equalizer, and a selector. The clock data recovery circuit is configured to generate a clock signal according to a first digital signal. The analog-to-digital converter is coupled to the clock data recovery circuit, and configured to convert a first analog signal to a second digital signal according to the clock signal. The channel evaluating circuit is configured to analyze the second digital signal to output a selection signal. The first equalizer is coupled to the analog-to-digital converter, and configured to equalize the second digital signal to generate a third digital signal. The selector is coupled between the first equalizer, the analog-to-digital converter, and the clock data recovery circuit. The selector is configured to output the second digital signal as the first digital signal or to output the third digital signal as the first digital signal according to the selection signal.

An embodiment of the present disclosure is associated with a clock data recovery method which includes the following operations: by a clock data recovery circuit, performing a clock data recovery to a first digital signal and generating a clock signal; by an analog-to-digital converter, converting a first analog signal to generate a second digital signal according to the clock signal; and directly outputting the second digital signal as the first digital signal or outputting a third digital signal as the first digital signal according to the second digital signal. The third digital signal is obtained by equalizing the second digital signal.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In this document, the term "coupled" may also be termed as "electrically coupled", and the term "connected" may be termed as "electrically connected". "Coupled" and "connected" may also be used to indicate that two or more elements cooperate or interact with each other.

In this document, the term "circuitry" may be used herein to describe a system including one of more circuit. The term "circuit" may be used herein to describe a device having one or more transistors and/or one or more active elements connecting in a particular configuration to process signal.

Figure 1:
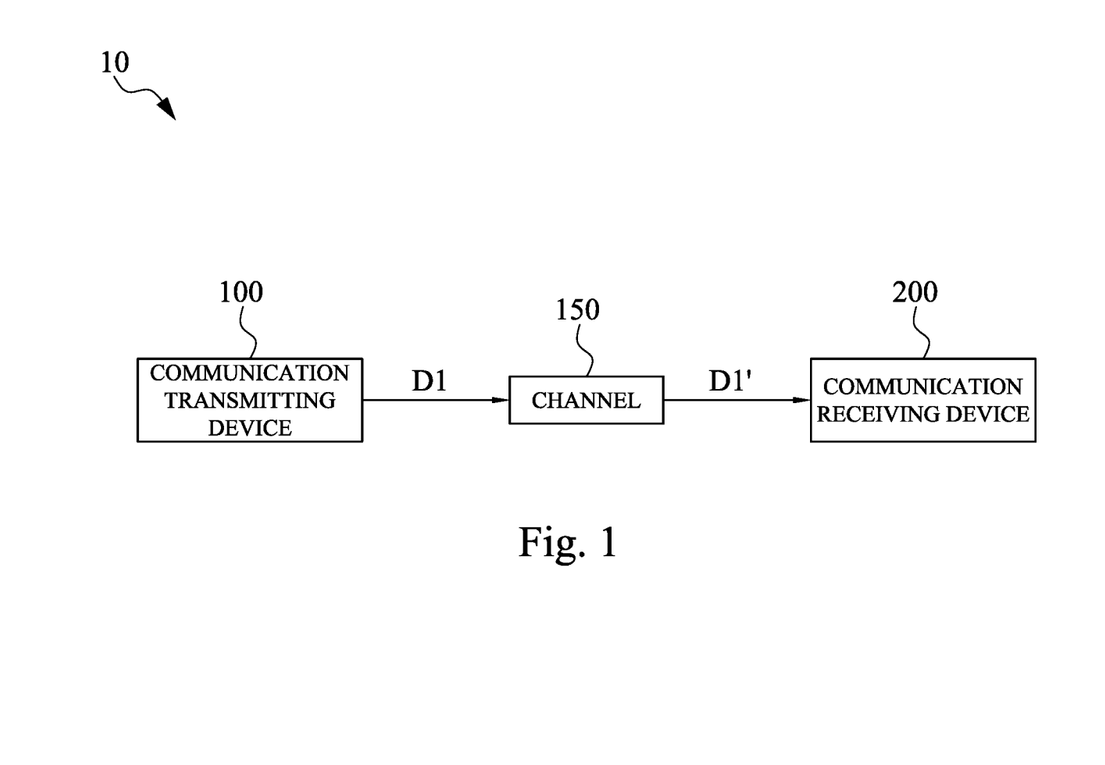
FIG. 1 is a schematic diagram of a communication system, in accordance with some embodiments.

Reference is now made to FIG. 1. FIG. 1 is a schematic diagram of a communication system 10, in accordance with some embodiments of the present disclosure. For illustration in FIG. 1, the communication system 10 includes a communication transmitting device 100, a channel 150, and a communication receiving device 200. The channel 150 is coupled between the communication transmitting device 100 and the communication receiving device 200, however, the present disclosure is not limited hereto. For example, the communication system 10 further includes connectors (not shown) coupled between the channel 150 and the communication transmitting device 100, and coupled between the channel 150 and the communication receiving device 200. In some embodiments, the communication system 10 is a serializer/deserializer (SerDes) system, however, the present disclosure is not limited hereto.

In some embodiments, the communication transmitting device 100 is configured to output a data signal D1, and the data signal D1 is configured to be transmitted to the communication receiving device 200 through the channel 150. The communication device 200 is configured to receive a data signal D1' transmitted through the channel 150. In some embodiments, the data signal D1 is an analog signal or a digital signal.

In some embodiments, the data signal D1 outputted by the communication transmitting device 100 has a higher power than the data signal D1' received by the communication receiving device 200 due to the loss of the channel 150. In some embodiments, the loss of the channel 150 corresponding to the data signal D1 is associated with the frequency of the data signal D1. In general, the high frequency component of the data signal D1 is more attenuated than the low frequency component of the data signal D1 by the channel 150. Alternatively stated, after the data signal D1 transmitting through the channel 150, the losses on different frequency have different power responses.

In some applications, the data signal D1 is transmitted through the channel 150, and the data signal D1 has different power losses corresponding to different frequency which causes signal delay in the following transmission or signal processes. The delayed signal overlaps with the subsequent data signal and further causes the inter-symbol interference (ISI), and the data signal D1' has distortion.

Based on the above characteristic, if the ISI has to be decreased, the communication receiving device 200 amplifies as least part of spectrum of the data signal D1' in order to maintain the received data signal D1' having the same power or the same power ratio among the spectrum as the data signal D1.

In some embodiments, the communication receiving device 200 is configured to perform the clock data recovery to the data signal D1'. If the data signal D1' has distortion (i.e., the data signal D1' is affected by the ISI mentioned above), the accuracy of the clock data recovery will be affected. Therefore, before and during performing the clock data recovery, the communication receiving device 200 is configured to determine the power of the data signal D1' to determine whether the power of the data signal D1' need to be adjusted. Hence, the reliability of the communication system 10 and the accuracy of the clock data recovery can be improved.

Figure 2A:
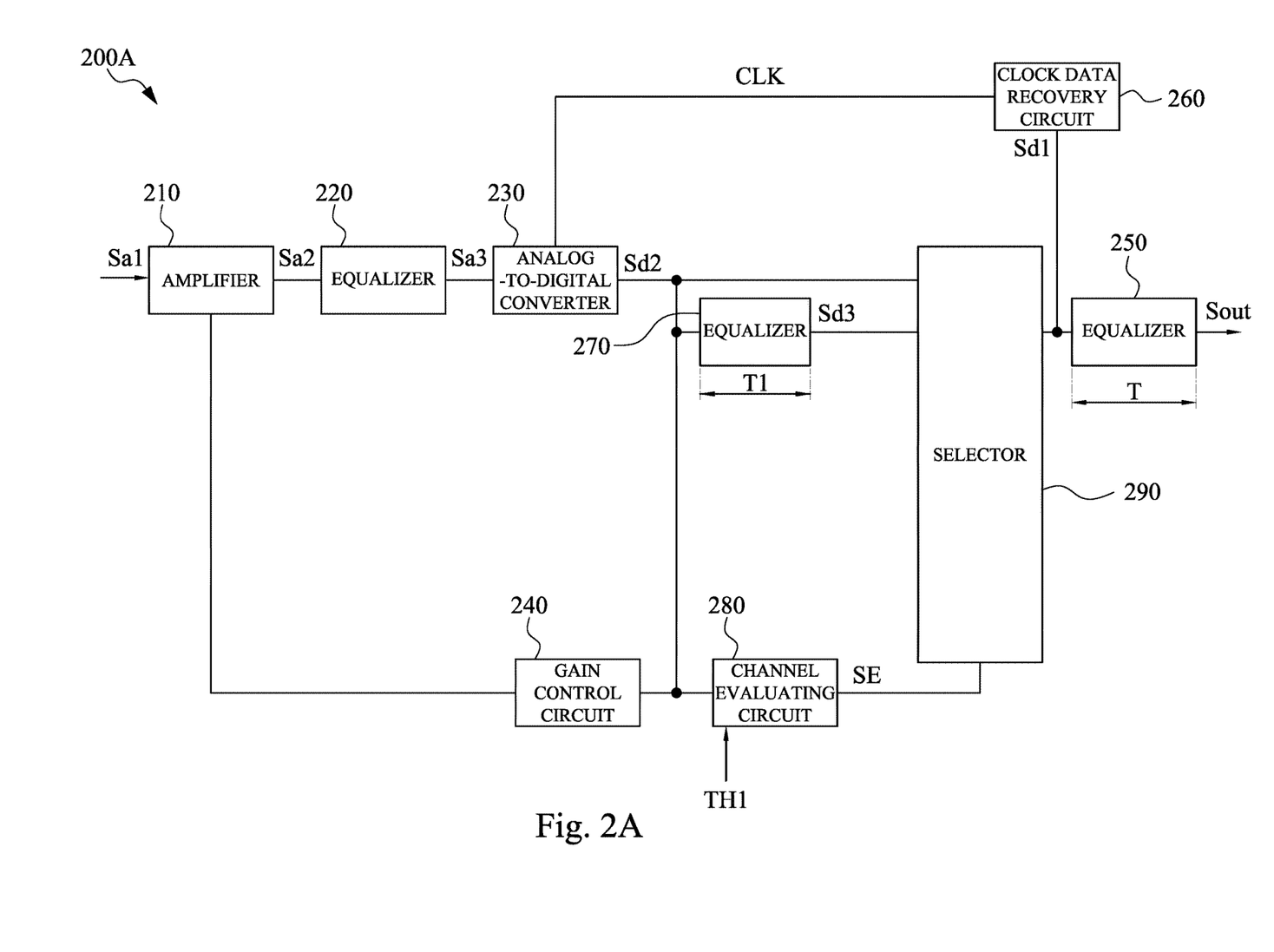
FIG. 2A is a schematic diagram of a communication receiving device of the communication system illustrated in FIG. 1, in accordance with some embodiments.

Reference is made to FIG. 2A. FIG. 2A is a schematic diagram of a communication receiving device 200A, in accordance with some embodiments of the present disclosure. The communication receiving device 200A is embodiments of the communication receiving device 200 of the communication system 10. In some embodiments, the communication receiving device 200A includes an amplifier 210, an equalizer 220, an analog-to-digital converter 230, a gain control circuit 240, an equalizer 250, a clock data recovery circuit 260, an equalizer 270, a channel evaluating circuit 280, and a selector 290.

For illustration in FIG. 2A, the amplifier 210 is coupled to the equalizer 220. The equalizer 220 is coupled to the analog-to-digital converter 230. The analog-to-digital converter 230 is coupled to the gain control circuit 240, the equalizer 270, the channel evaluating circuit 280, the clock data recovery circuit 260, and the selector 290. The gain control circuit 240 is further coupled to the amplifier 210 and the analog-to-digital converter 230. The clock data recovery circuit 260 is further coupled to a node between the selector 290 and the equalizer 250.

In some embodiments, the amplifier 210 receives an analog signal Sa1 and amplifies the analog signal Sa1 to generate an analog signal Sa2. In some embodiments, a gain of the amplifier 210 is able to be adjusted by the gain control circuit 240, and the amplifier 210 is able to amplify the analog signal Sa1 as the analog signal Sa2 according to the gain. In some embodiments, the amplifier 210 is variable gain amplifier (VGA). In some embodiments, the gain control circuit 240 is implemented by an automatic gain controller (AGC), and automatically adjusts the gain of the amplifier 210 according to a power of the digital signal Sd2.

In some embodiments, the equalizer 220 is configured to receive the analog signal Sa2 and equalize the analog signal Sa2 to generate an analog signal Sa3. In some embodiments, the equalizer 220 decreases the power of the low frequency component of the analog signal Sa2 to make the power of the low frequency component of the analog signal Sa2 be similar to the power of the high frequency component of the analog signal Sa2. Alternatively stated, the equalizer 220 is a high pass filter. In some embodiments, the equalizer 220 is a continuous time linear equalizer (CTLE).

In some embodiments, the clock data recovery circuit 260 is configured to receive a digital signal Sd1 and generate a clock signal CLK according to the digital signal Sd1. The clock data recovery circuit 260 is further configured to transmit the generated clock signal CLK to the analog-to-digital converter 230.

In some embodiments, the analog-to-digital recovery 230 is configured to receive an analog signal Sa3 and the clock signal CLK, and configured to convert the analog signal Sa3 to generate a digital signal Sd2 according to the clock signal CLK.

In some embodiments, the channel evaluating circuit 280 is configured to determine whether a power of the digital signal Sd2 is smaller than a pre-determined threshold TH1. If the power of the digital signal Sd2 is smaller than the pre-determined threshold TH1, the equalizer 270 equalizes the digital signal Sd2 to output a digital signal Sd3, and the digital signal Sd3 is outputted as the digital signal Sd1 by the selector 290. In contrast, if the power of the digital signal Sd2 is not smaller than the pre-determined threshold TH1, the selector 290 directly outputs the digital signal Sd2 as the digital signal Sd1. In some embodiments, the equalizing operation performed by the equalizer 270 has lower delay. Therefore, the accuracy of the clock data recovery circuit 260 is maintained because the delay among the whole system is able to be decreased and the ISI issue is improved by the equalizing operation when the loss is higher.

In some other embodiments, the channel evaluating circuit 280 is configured to measure the amplitude of the high frequency component (and/or low frequency component) of the digital signal Sd2. For example, if the power of the high frequency component of the digital signal Sd2 is lower than the pre-determined threshold TH1, the equalizer 270 equalizes the digital signal Sd2 to output the digital signal Sd3, and the digital signal Sd3 is outputted as the digital signal Sd1 by the selector 290. In contrast, if the power of the high frequency component of the digital signal Sd2 is not lower than the pre-determined threshold TH1, the selector 290 directly outputs the digital signal Sd2 as the digital signal Sd1.

In some embodiments, the analog signal Sa3 is associated with the analog signal Sa1 transmitted through the channel 150, and the channel evaluating circuit 280 is further configured to analyze the digital signal Sd2 to evaluate the characteristic of the channel 150.

In some embodiments, the equalizer 250 is configured to equalize the digital signal Sd1 to generate output signal Sout. The equalizer 250 is configured to improve the ISI issue in the digital signal Sd1. For illustration in FIG. 2A, the digital signal Sd1 is inputted into the equalizer 250 after the clock data recovery is performed to generate the output signal Sout. In some embodiments, the equalizer 250 is feed forward equalizer (FFE).

In some embodiments, the analog-to-digital converter 230 generates the digital signal Sd2, and transmits the digital signal Sd2 to the selector 290 and equalizer 270. The equalizer 270 equalizes the received digital signal Sd2 as the digital signal Sd3, and transmits the digital signal Sd3 to the selector 290.

In some embodiments, the channel evaluating circuit 280 is configured to calculate the power of the digital signal Sd2, and generate a selection signal SE according to the power of the digital signal Sd2. The channel evaluating circuit 280 outputs the selection signal SE to the selector 290. The selector 290 selects the output of the analog-to-digital converter 230 or the output of the equalizer 270 to connect the clock data recovery circuit 260 according to the selection signal SE. Alternatively stated, according to the operation of the selector 290, the digital signal Sd2 is directly outputted as digital signal Sd1 or the digital signal Sd3 is outputted as the digital signal Sd1 to perform the clock data recovery.

In some other embodiments, the channel evaluating circuit 280 is configured to calculate the amplitude of the high frequency component (and/or low frequency component) of the digital signal Sd2, and generate the selection signal SE according to the amplitude of the high frequency component (and/or low frequency component) of the digital signal Sd2. The channel evaluating circuit 280 outputs the selection signal SE to the selector 290. The selector 290 selects the output of the analog-to-digital converter 230 or the output of the equalizer 270 to connect the clock data recovery circuit 260 according to the selection signal SE. Alternatively stated, according to the operation of the selector 290, the digital signal Sd2 is directly outputted as digital signal Sd1 or the digital signal Sd3 is outputted as the digital signal Sd1 to perform the clock data recovery.

In some embodiments, the power and/or amplitude of the digital signal Sd2 corresponds to the characteristic of the channel 150 which includes, for example, the insertion loss. For example, the smaller the power and/or amplitude of the digital signal Sd2, the larger the insertion loss.

In some embodiments, the channel evaluating circuit 280 can be implemented by a processing circuit which performs fast Fourier transform (FFT) and comparing operation. According to the digital signal Sd2, the processing circuit performs the FFT to calculate the power spectrum density corresponding to the digital signal Sd2 to obtain the power and/or amplitude of the digital signal Sd2. The above implementation of the channel evaluating circuit 280 is provided for illustrative purposes, however, the present disclosure is not limited hereto.

In some embodiments, the equalizer 270 is FFE. A delay period T1 of the equalizer 270 is shorter than a delay period T of the equalizer 250. In some embodiments, the equalizer 270 can be implemented by simple operation circuit, for example, the equalizer 270 can be implemented by second-order Z-transform circuit. In some embodiments, the transform function of the equalizer 270 can be $-2^{-k1}+Z^{-1}-2^{-k2}Z^{-2}$, in which k1 and k2 are constant. The above transform function of the equalizer 270 is provided for illustrative purposes, however, the present disclosure is not limited hereto.

In some embodiments, if the power of the digital signal Sd2 is large enough, the selector 290 directly outputs the digital signal Sd2 as the digital signal Sd1 to perform the clock data recovery. In some embodiments, if the power of the digital signal Sd2 is not large enough, the digital signal Sd2 is equalized as the digital signal Sd3 by the equalizer 270, and then the selector 290 outputs the digital signal Sd3 as the digital signal Sd1 to perform the clock data recovery.

In some other embodiments, if the amplitude of the high frequency component of the digital signal Sd2 is large enough, the selector 290 directly outputs the digital signal Sd2 as the digital signal Sd1 to perform the clock data recovery. In some embodiments, if the amplitude of the high frequency component of the digital signal Sd2 is not large enough, the digital signal Sd2 is equalized as the digital signal Sd3 by the equalizer 270, and then the selector 290 outputs the digital signal Sd3 as the digital signal Sd1 to perform the clock data recovery.

In some embodiments, the channel evaluating circuit 280 is further configured to compare the power of the digital signal Sd2 with the pre-determined threshold TH1. When the power of the digital signal Sd2 is not smaller than the pre-determined threshold TH1, the channel evaluating circuit 280 transmits the selection signal SE having a first logic value to the selector 290. In response to the first logic value, the selector 290 selects the digital signal Sd2 to directly output as the digital signal Sd1. In contrast, when the power of the digital signal Sd2 is smaller than the pre-determined threshold TH1, the channel evaluating circuit 280 transmits the selection signal SE having a second logic value to the selector 290. In response to the second logic value, the selector 290 selects the digital signal Sd3 to output as the digital signal Sd1.

In some embodiments, the power of the digital signal Sd2 is associated with the channel 150 of the communication system 10. For example, when the channel 150 is longer, the loss of the channel 150 is larger. Thus, the power of the digital signal Sd2 obtained from measurement is smaller. In contrast, when the channel 150 is shorter, the loss of the channel 150 is smaller. Thus, the power of the digital signal Sd2 obtained from measurement is larger. Alternatively stated, the pre-determined threshold TH1 is associated with the loss of the channel 150.

In some other embodiments, the amplitude of the high frequency component of the digital signal Sd2 and the amplitude of the low frequency component of the digital signal Sd2 are associated with the channel 150. For example, when the channel 150 is longer, the loss of the channel 150 is larger. Thus, the amplitude of the digital signal Sd2 obtained from measurement is smaller. In contrast, when the channel 150 is shorter, the loss of the channel 150 is smaller. Thus, the amplitude of the digital signal Sd2 obtained from measurement is larger.

Based on the above, the communication receiving device 200A has a function to adjust the signal transmitting path according to the power of the digital signal Sd2, and the function is configured to improve the accuracy of the clock data recovery and the delay period of the whole system. Furthermore, the communication receiving device 200A has the function to adjust the path of clock data recovery according to the loss of the channel 150.

The communication receiving device 200A shown in FIG. 2A is provided for illustrative purposes. Various communication receiving devices 200A are within the contemplated scope of the present disclosure. For example, the channel evaluating circuit 280 can be incorporated into the gain control circuit 240 as a part of components of the gain control circuit 240. For another example, the channel evaluating circuit 280 can be arranged in other position of the communication receiving device 200A, such as the discussion below shown in FIG. 4 and FIG. 5.

Figure 2B:
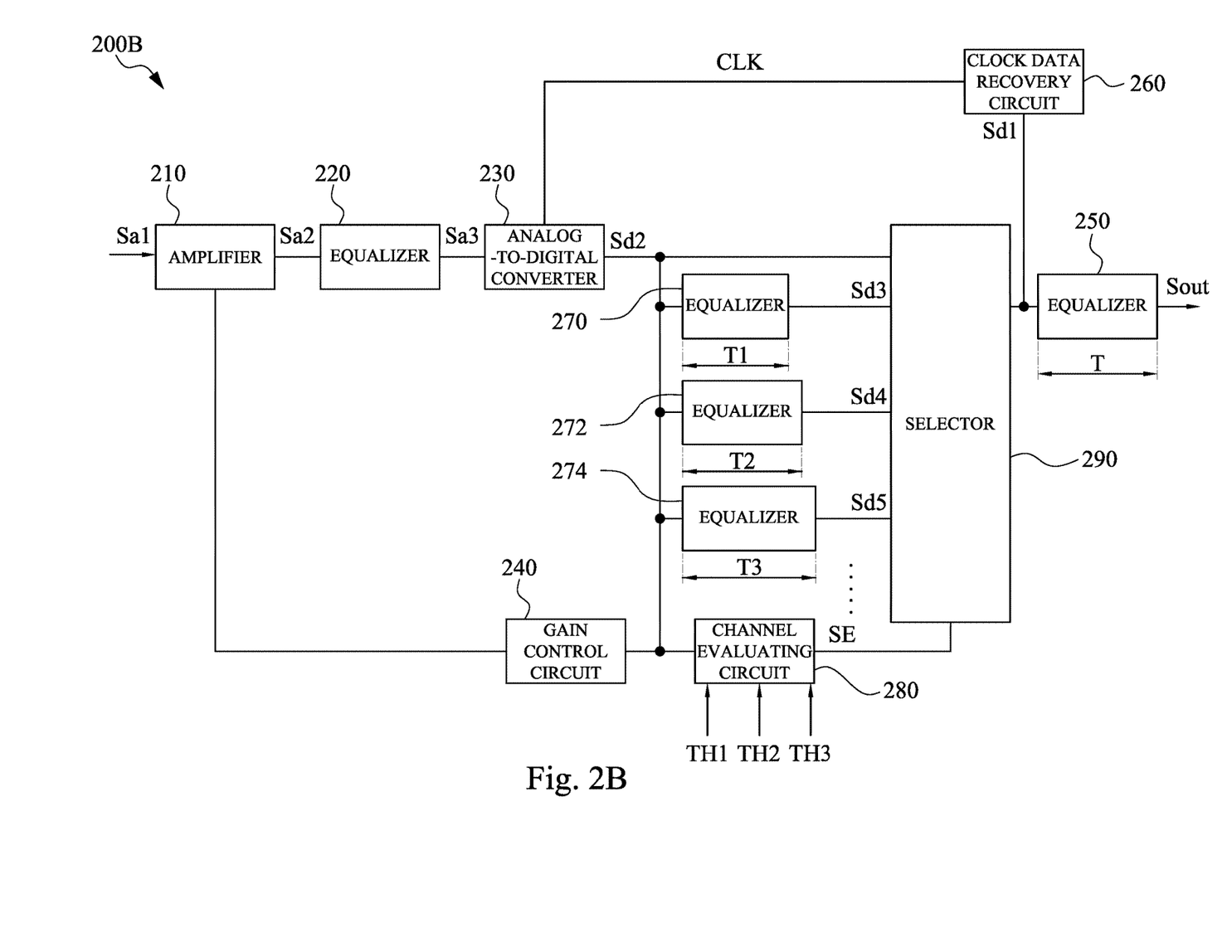
FIG. 2B is a schematic diagram of the communication receiving device of the communication system illustrated in FIG. 1, in accordance with some other embodiments.

Reference is made to FIG. 2B. FIG. 2B is a schematic diagram of the communication receiving device 200B, in accordance with some other embodiments of the present disclosure. The communication receiving device 200B is embodiments of the communication receiving device 200 of the communication system 10. For ease of understanding, like elements in FIG. 2B are designated with the same reference numbers as FIG. 2A. In some embodiments, the communication receiving device 200B includes an amplifier 210, an equalizer 220, an analog-to-digital converter 230, a gain control circuit 240, an equalizer 250, a clock data recovery circuit 260, an equalizer 270, a channel evaluating circuit 280, a selector 290, an equalizer 272, and an equalizer 274.

In some embodiments, the amplifier 210, the equalizer 220, an analog-to-digital converter 230, a gain control circuit 240, an equalizer 250, and a clock data recovery circuit 260 are configured to perform the similar operations as discussed in FIG. 2A. The similar operations will not be described herein again.

Compared to FIG. 2A, the communication receiving device 200B further includes equalizers 272 and 274, those equalizers have different delay periods to each other. The equalizer 270 is configured to equalize the digital signal Sd2 as the digital signal Sd3. The equalizer 272 is configured to equalize the digital signal Sd2 as the digital signal Sd4. The equalizer 274 is configured to equalize the digital signal Sd2 as the digital signal Sd5.

In some embodiments, the channel evaluating circuit 280 is configured to output the selection signal SE according multiple pre-determined thresholds TH1-TH3, and those pre-determined thresholds TH1-TH3 are configured to distinguish different powers of the digital signal Sd2. Therefore, the selector 290 is able to select the corresponded equalizers 270, 272, and 274 according to the selection signal SE, and transmit the digital signal Sd2, the digital signal Sd3, the digital signal Sd4, or the digital signal Sd5 as the digital signal Sd1.

For example, the pre-determined threshold TH1 is larger than the pre-determined threshold TH2, and the pre-determined threshold TH2 is larger than the pre-determined threshold TH3. The gain of the equalizer 270 is higher than the gain of the equalizer 272, and the gain of the equalizer 272 is higher than the gain of the equalizer 274. Under this setting, when the power of the digital signal Sd2 is not smaller than the pre-determined threshold TH1, the channel evaluating circuit 280 transmits the selection signal SE to the selector 290, and makes the selector 290 select the digital signal Sd2 to directly output the digital signal Sd2 as the digital signal Sd1. When the power of the digital signal Sd2 is smaller than the pre-determined threshold TH1 but is not smaller than the pre-determined threshold TH2, the channel evaluating circuit 280 transmits the selection signal SE to the selector 290, and makes the selector 290 select the digital signal Sd3 to output the digital signal Sd3 as the digital signal Sd1. In addition, when the power of the digital signal Sd2 is smaller than the pre-determined threshold TH2 but is not smaller than the pre-determined threshold TH3, the channel evaluating circuit 280 transmits the selection signal SE to the selector 290, and makes the selector 290 select the digital signal Sd4 to output the digital signal Sd4 as the digital signal Sd1. Moreover, when the power of the digital signal Sd2 is smaller than the pre-determined threshold TH3, the channel evaluating circuit 280 transmits the selection signal SE to the selector 290, and makes the selector 290 select the digital signal Sd5 to output the digital signal Sd5 as the digital signal Sd1. Under this condition, the delay period T1 of the equalizer 270 is smaller than the delay period T2 of the equalizer 272, and the delay period T2 of the equalizer 272 is smaller than the delay period T3 of the equalizer 274.

In other words, when the power of the digital signal Sd2 is smaller than the pre-determined threshold TH1, the equalizing operation experienced by the digital signal Sd2 which has smaller power makes the equalized digital signal Sd1 have fewer ISI and longer delay period.

Compared to the communication receiving device 200A, the communication receiving device 200B has more signal transmitting path configured to transmit signal to perform the clock data recovery.

Therefore, the data signal having different loss and different ISI can be performed the clock data recovery by the communication receiving device 200 according to different signal transmitting path. When the loss of the data signal is not large, the data signal has slighter ISI, and the communication receiving device 200 selects the signal transmitting path which has shorter delay period to equalizer the digital signal Sd2 and then performs the clock data recovery. When the loss of the data signal is larger, the data signal has severer ISI, and the communication receiving device 200 selects the signal transmitting path which has longer delay period to equalizer the digital signal Sd2 and then performs the clock data recovery.

Figure 3:
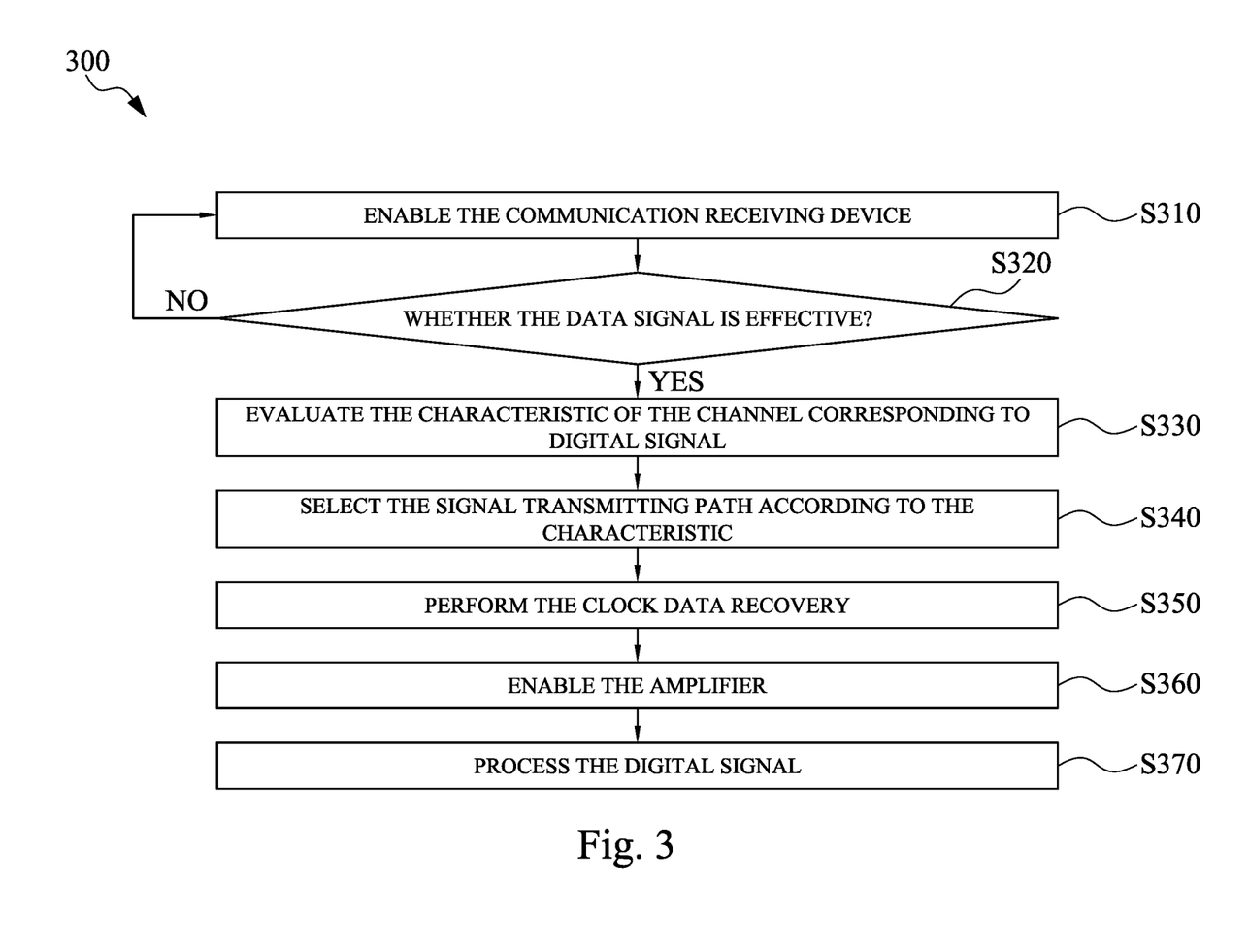
FIG. 3 is a flow chart of operations applied in the communication receiving device illustrated in FIGS. 2A-2B, in accordance with some embodiments.

Reference is made to FIG. 3. FIG. 3 is a flow chart of method 300 applied in the communication receiving device 200 illustrated in FIGS. 2A-2B, in accordance with some embodiments of the present disclosure. For illustration in FIG. 3, the method 300 includes operations S310, S320, S330, S340, S350, S360, and S370. The method 300 will be described with reference to FIGS. 1, 2A, and 2B and the reference numbers thereof.

In operation S310, the communication receiving device 200 is enabled. In some embodiments, the communication receiving device 200 is also referred to as a receiver (RX).

In operation S320, the communication receiving device 200 receives the data signal D1' and determines whether the data signal D1' is effective. If the received data signal D1' is effective, the operation S330 is then performed. If the received data signal D1' is not effective, the operation S310 is then performed.

In operation S330, the amplifier 210 transmits the analog signal Sa1 to generate the analog signal Sa2, the equalizer 220 equalizers the analog signal Sa2 to generate the analog signal Sa3, the analog-to-digital converter 230 converts the analog signal Sa3 to the digital signal Sd2, and the channel evaluating circuit 280 evaluates the characteristic of the channel 150 corresponding to digital signal Sd2. The channel evaluating circuit 280 evaluating the characteristic of the channel 150 corresponding to digital signal Sd2 includes calculating the power of the digital signal Sd2 and/or measuring the amplitude of the digital signal Sd2.

In operation S340, the channel evaluating circuit 280 generates the selection signal SE according to the characteristic of the channel 150 (e.g., the power of digital signal Sd2) and the pre-determined thresholds TH1-TH3, and transmits the selection signal SE to the selector 290. The selector 290 selects corresponding signal transmitting path to output the digital signal Sd2, the digital signal Sd3, the digital signal Sd4, or the digital signal Sd5 as the digital signal Sd1 according to the selection signal SE.

In operation S350, the clock data recovery circuit 260 performs the clock data recovery to generate the clock signal CLK according to the digital signal Sd1, and transmits the clock signal CLK to the analog-to-digital converter 230.

In operation S360, the amplifier 210 is enabled. The amplifier 230 amplifies the analog signal Sa1 as the analog signal Sa2. In some embodiments, the amplifier 210 is a VGA.

In operation S370, the digital signal processes are performed. The equalizer 220 equalizes the analog digital Sa2 to generate the analog signal Sa3, the clock data recovery circuit 260 performs the clock data recovery to generate the clock signal CLK according to the signal transmitting path selected in operation S340, the analog-to-digital converter 230 converts the analog signal Sa3 as the digital signal Sd2, the selector 290 directly outputs the digital signal Sd2 as the digital signal Sd1 or outputs the digital signal Sd3 as the digital signal Sd1 according to the signal transmitting path selected in operation S340. In some embodiments, the equalizer 250 equalizes the digital signal Sd1 as the output signal Sout.

The above method 300 includes exemplary operations, but the method 300 is not necessarily performed in the order shown. The method 300 may be added, replaced, changed order, and/or eliminated as appropriate, in accordance with the spirit and scope of various embodiments of the present disclosure.

Figure 4:
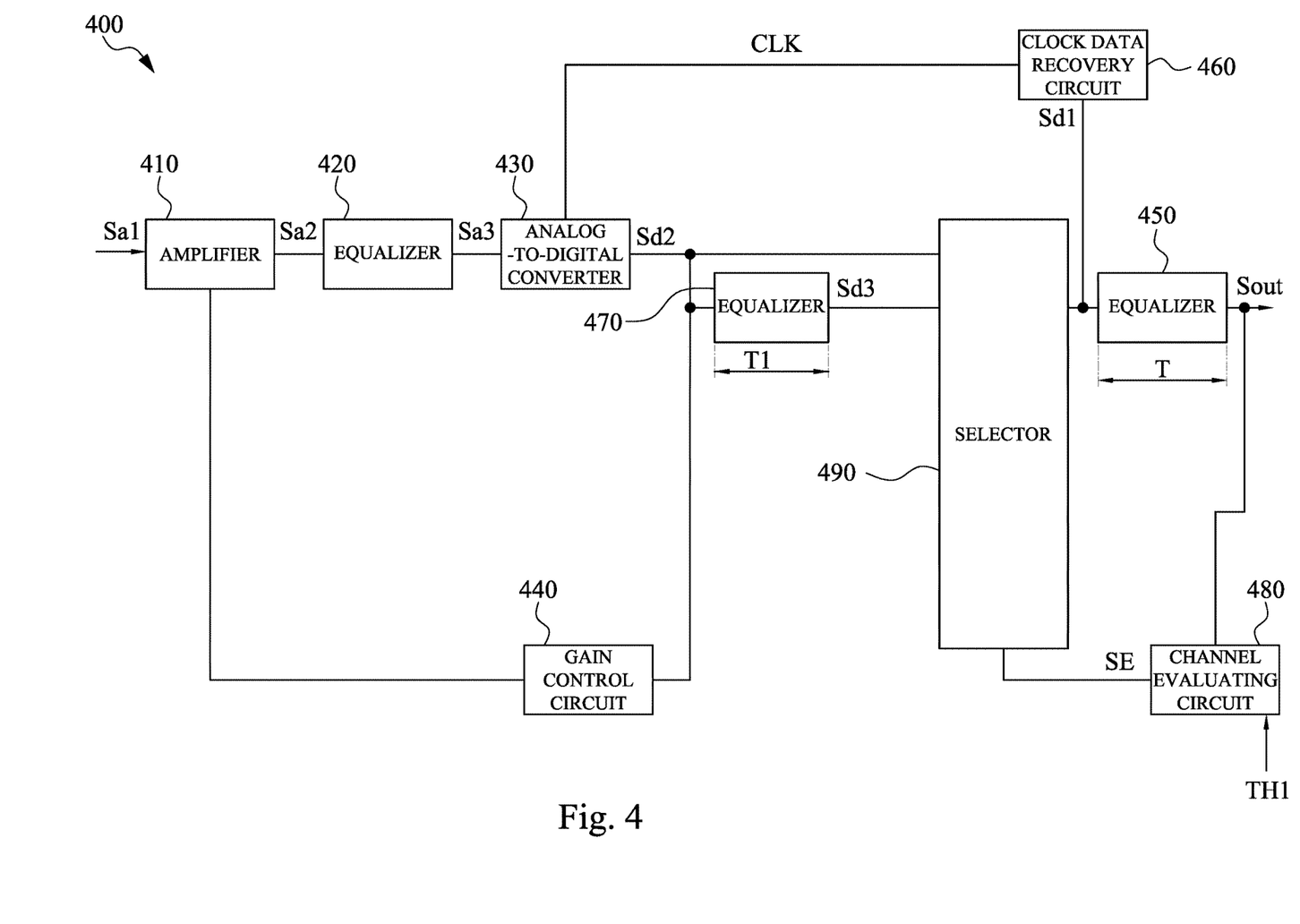
FIG. 4 is a schematic diagram of the communication receiving device of the communication system illustrated in FIG. 1, in accordance with some other embodiments.

Reference is mad e to FIG. 4. FIG. 4 is a schematic diagram of the communication receiving device 400, in accordance with some other embodiments of the present disclosure. The communication receiving device 400 is embodiments of the communication receiving device 200 of the communication system 10. In some embodiments, the communication receiving device 400 includes an amplifier 410, an equalizer 420, an analog-to-digital converter 430, a gain control circuit 440, an equalizer 450, a clock data recovery circuit 460, an equalizer 470, a channel evaluating circuit 480, and a selector 490.

For illustration in FIG. 4, the amplifier 410 is coupled to the equalizer 420. The equalizer 420 is coupled to the analog-to-digital converter 430. The analog-to-digital converter 430 is coupled to the gain control circuit 440, the equalizer 470, the clock data recovery 460, and the selector 490. The gain control circuit 440 is further coupled to the amplifier 410. The clock data recovery circuit 460 is further coupled to a node between the selector 490 and the equalizer 450. The channel evaluating circuit 480 is coupled to the equalizer 450 and the selector 490.

In some embodiments, the amplifier 410, the equalizer 420, the analog-to-digital converter 430, the gain control circuit 440, the equalizer 450, the clock data recovery circuit 460, the equalizer 470, and the selector 490 have the similar functions with respect to the like elements shown in FIG. 2A, thus, the said functions will not be described herein again.

Compared to FIG. 2A, in some embodiments, the channel evaluating circuit 480 is configured to determine whether the power of the output signal Sout is smaller the pre-determined threshold TH1, and generate the selection signal SE to the selector 490 according to the determined result. If the power of the output signal Sout is smaller than the pre-determined threshold TH1, the selector 490 outputs the digital signal Sd3 equalized by the equalizer 470 as the digital signal Sd1 according to the selection signal SE to perform the clock data recovery. In contrast, if the power of the output signal Sout is not smaller than the pre-determined threshold TH1, the selector 490 directly outputs the digital signal Sd2 as the digital signal Sd1 according to the selection signal SE to perform the clock data recovery.

In some embodiments, the power of the output signal Sout is associated with the channel 150 of the communication system 10. For example, when the channel 150 is longer, the channel 150 has higher loss. Thus, the power of output signal Sout obtained from the measuring is smaller. In contrast, when the channel 150 is shorter, the channel 150 has lower loss. Thus, the power of output signal Sout obtained from the measuring is larger. Alternatively stated, the setting of the pre-determined threshold TH1 is associated with the loss of the channel 150.

Based on the above, the communication receiving device 400 has a function to adjust the signal transmitting path according to the power of the output signal Sout, and the said function is configured to improve the accuracy of the clock data recovery and the delay period of the whole system. Furthermore, the communication receiving device 400 has the function to adjust the path of clock data recovery according to the loss of the channel 150.

Figure 5:
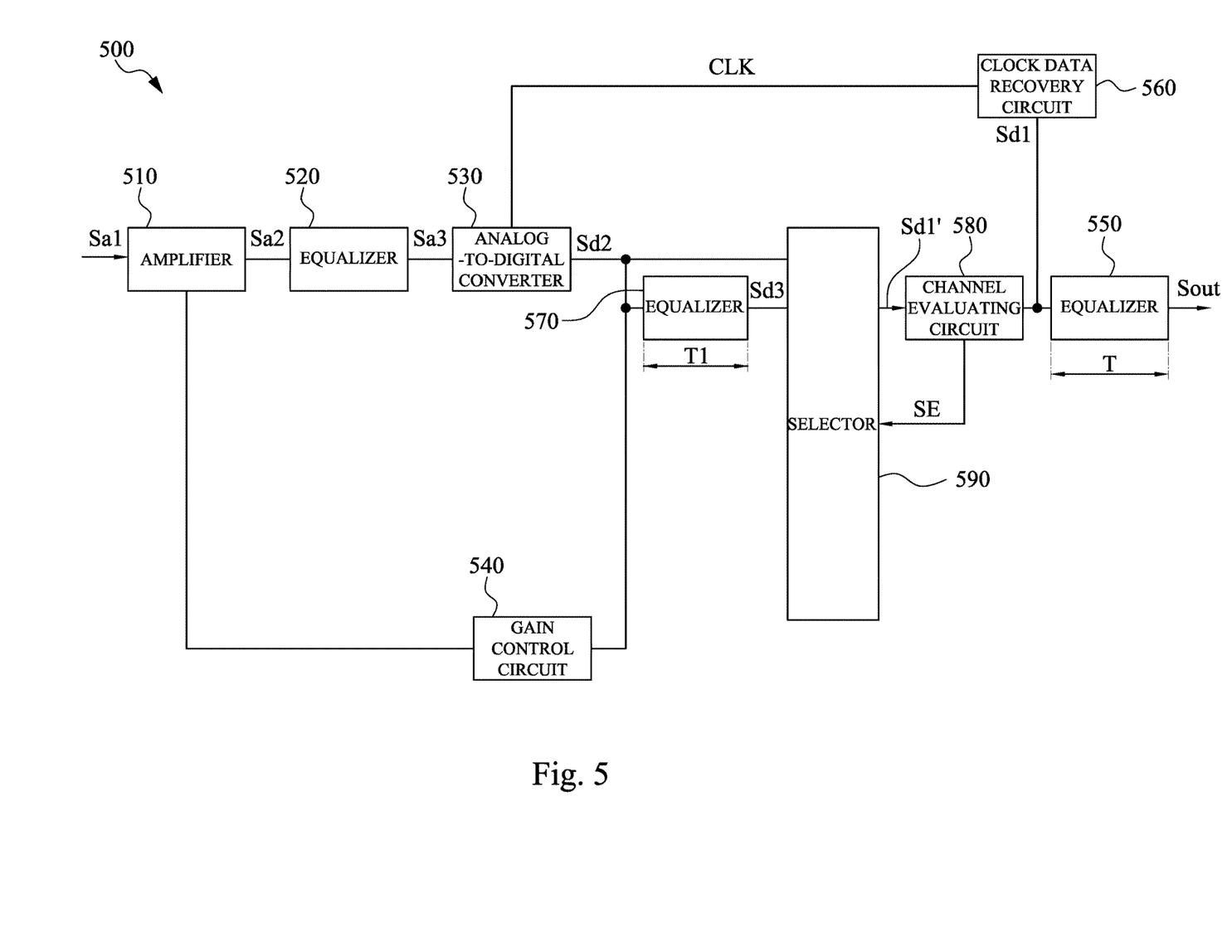
FIG. 5 is a schematic diagram of the communication receiving device of the communication system illustrated in FIG. 1, in accordance with some other embodiments.

Reference is made to FIG. 5. FIG. 5 is a schematic diagram of the communication receiving device 500, in accordance with some other embodiments of the present disclosure. The communication receiving device 500 is embodiments of the communication receiving device 200 of the communication system 10. In some embodiments, the communication receiving device 500 includes an amplifier 510, an equalizer 520, an analog-to-digital converter 530, a gain control circuit 540, an equalizer 550, a clock data recovery circuit 560, an equalizer 570, a channel evaluating circuit 580, and a selector 590.

For illustration in FIG. 5, the amplifier 510 is coupled to the equalizer 520. The equalizer 520 is coupled to the analog-to-digital converter 530. The analog-to-digital converter 530 is coupled to the gain control circuit 540, the equalizer 570, the clock data recovery 560, and the selector 590. The gain control circuit 540 is further coupled to the amplifier 510. The clock data recovery circuit 560 is further coupled to a node between the channel evaluating circuit 580 and the equalizer 550. The selector 590 is coupled to the channel evaluating circuit 580.

In some embodiments, the amplifier 510, the equalizer 520, the analog-to-digital converter 530, the gain control circuit 540, the equalizer 550, the clock data recovery circuit 560, the equalizer 570, and the selector 590 have the similar functions with respect to the like elements shown in FIG. 2A, thus, the said functions will not be described herein again.

Compared to FIG. 2A, in some embodiments, the channel evaluating circuit 580 is configured to measure the frequency response of the digital signal Sd1' corresponding to the channel 150, in which the digital signal Sd1' is outputted by the selector 590, and generate the selection signal SE to feed back to the selector 590 according to the frequency response. The channel evaluating circuit 580 is configured to dynamically adjust the signal transmitting path of the communication receiving device 500. The selector 590, according to the selection signal SE, selects the digital signal Sd3 equalized by the equalizer 570 to output the digital signal Sd3 as the digital signal Sd1' or selects the digital signal Sd2 to output the digital signal Sd2 as the digital signal Sd1' to perform the clock data recovery. The digital signal Sd1' passes through the channel evaluating circuit 580 and becomes the digital signal Sd1, and the digital signal Sd1 is processed to perform the clock data recovery. In some embodiments, the channel evaluating circuit 580 is implemented by an adaptive circuit.

Based on the above, the communication receiving device 500 has a function to adjust the signal transmitting path according to the frequency response of the digital signal Sd1' corresponding to the channel 150, and the said function is configured to improve the accuracy of the clock data recovery and the delay period of the whole system.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A communication receiving device, comprising:
    a clock data recovery circuit configured to generate a clock signal according to a first digital signal;
    an analog-to-digital converter coupled to the clock data recovery circuit, and configured to convert a first analog signal to a second digital signal according to the clock signal;
    a channel evaluating circuit configured to analyze the second digital signal and generate a selection signal according to the characteristic of the second digital signal;
    a first equalizer coupled to the analog-to-digital converter, and configured to equalize the second digital signal to generate a third digital signal; and
    a selector coupled between the first equalizer, the analog-to-digital converter, and the clock data recovery circuit, and configured to output the second digital signal as the first digital signal or to output the third digital signal as the first digital signal according to the selection signal that the selector received from the channel evaluating circuit.

2. The communication receiving device of claim 1, wherein the first analog signal is associated with a second analog signal transmitted from a channel, and the channel evaluating circuit is further configured to analyze the second digital signal to evaluate a characteristic of the channel.

3. The communication receiving device of claim 1, wherein the channel evaluating circuit is configured to measure an amplitude of the second digital signal to generate the selection signal.

4. The communication receiving device of claim 1, wherein the channel evaluating circuit is configured to measure a power of the second digital signal to generate the selection signal.

5. The communication receiving device of claim 4, wherein when the power is not lower than a pre-determined threshold, the selector is configured to directly output the second digital signal as the first digital signal.

6. The communication receiving device of claim 4, wherein when the power is lower than a pre-determined threshold, the selector is configured to transmit the third digital signal as the first digital signal.

7. The communication receiving device of claim 1, further comprising:
    an amplifier configured to amplify a second analog signal as a third analog signal;
    a second equalizer coupled between the amplifier and the analog-to-digital converter, and configured to equalize the second analog signal to generate the first analog signal; and
    a gain control circuit coupled between the analog-to-digital converter and the amplifier, and configured to adjust a gain of the amplifier according to the second digital signal.

8. The communication receiving device of claim 1, further comprising:
    a third equalizer coupled to the selector, and configured to equalize the first digital signal to generate an output signal, wherein the first equalizer and the third equalizer are feed forward equalizers.

9. The communication receiving device of claim 8, wherein a delay period of the first equalizer equalizing the second digital signal is shorter than a delay period of the third equalizer equalizing the first digital signal.

10. A clock data recovery method, comprising:
    by a clock data recovery circuit, performing a clock data recovery to a first digital signal and generating a clock signal;
    by an analog-to-digital converter, converting a first analog signal to generate a second digital signal according to the clock signal;
    by a channel evaluating circuit, generating a selection signal according to the characteristic of the second digital signal; and
    by a selector, directly outputting the second digital signal as the first digital signal or outputting a third digital signal as the first digital signal according to the selection signal that the selector received from the channel evaluating circuit, wherein the third digital signal is obtained by equalizing the second digital signal.

11. The clock data recovery method of claim 10, wherein the second digital signal or the third digital signal is outputted as the first digital signal according to an amplitude of the second digital signal.

12. The clock data recovery method of claim 10, wherein the second digital signal or the third digital signal is outputted as the first digital signal according to a power of the second digital signal.

13. The clock data recovery method of claim 12, wherein outputting the second digital signal or the third digital signal as the first digital signal according to the power of the second digital signal comprises:
    when the power is smaller than a pre-determined threshold, outputting the third digital signal as the first digital signal; and
    when the power is not smaller than the pre-determined threshold, directly outputting the second digital signal as the first digital signal.

14. The clock data recovery method of claim 13, further comprising:
    by the channel evaluating circuit, calculating the power of the second digital signal;
    generating the selection signal according to the power and the pre-determined threshold; and by the selector, outputting the second digital signal or the third digital signal as the first digital signal according to the selection signal.

15. The clock data recovery method of claim 10, further comprising:
by a feed forward equalizer, equalizing the first digital signal to output an output signal.

16. The clock data recovery method of claim 15, wherein the second digital signal is equalized as the third digital signal by an equalizer, and a delay period of the equalizer equalizing the second digital signal is shorter than a delay period of the feed forward equalizer equalizing the first digital signal.

\* \* \* \* \*